United States Patent
Papenfuhs et al.

(10) Patent No.: US 7,358,304 B2
(45) Date of Patent: Apr. 15, 2008

(54) HIGH-MOLECULAR, CROSSLINKED POLYVINYL BUTYRALS, METHOD FOR THE PRODUCTION AND USE THEREOF

(75) Inventors: Bernd Papenfuhs, Obertshausen (DE); Martin Steuer, Liederbach (DE); Simon Jonas, Hattersheim (DE)

(73) Assignee: Kuraray Europe GmbH, Troisdorf (DE)

( * ) Notice: Subject to any disclaimer, the term of this patent is extended or adjusted under 35 U.S.C. 154(b) by 0 days.

(21) Appl. No.: 10/488,593

(22) PCT Filed: Aug. 31, 2002

(86) PCT No.: PCT/EP02/09743

§ 371 (c)(1),
(2), (4) Date: Oct. 4, 2004

(87) PCT Pub. No.: WO03/020776

PCT Pub. Date: Mar. 13, 2003

(65) Prior Publication Data

US 2005/0054772 A1    Mar. 10, 2005

(30) Foreign Application Priority Data

Sep. 4, 2001 (DE) ................................ 101 43 190

(51) Int. Cl.
*C08F 8/00* (2006.01)
*C08F 8/14* (2006.01)

(52) U.S. Cl. ............ 525/61; 525/56; 525/330.6; 525/328.7; 525/386; 524/557

(58) Field of Classification Search .......... 525/56, 525/61, 330.6, 328.7, 386; 524/557
See application file for complete search history.

(56) References Cited

U.S. PATENT DOCUMENTS

| | | | | |
|---|---|---|---|---|
| 3,575,790 A | * | 4/1971 | Fleck et al. | 428/442 |
| 4,210,564 A | * | 7/1980 | Pouchol | 524/557 |
| 4,814,529 A | * | 3/1989 | Cartier et al. | 525/61 |
| 4,935,463 A | * | 6/1990 | Stockel et al. | 524/423 |
| 5,332,774 A | | 7/1994 | Klang et al. | |

FOREIGN PATENT DOCUMENTS

| | | |
|---|---|---|
| DE | 888 008 C | 8/1953 |
| DE | 27 52 054 A1 | 6/1978 |
| DE | 197 17 395 A1 | 10/1998 |
| EP | 0 024 055 A1 | 2/1981 |
| EP | 0 211 818 A1 | 2/1987 |
| EP | 0 211 819 A1 | 2/1987 |
| EP | 0 283 180 A2 | 9/1988 |

* cited by examiner

*Primary Examiner*—Randy Gulakowski
*Assistant Examiner*—M. Bernshteyn
(74) *Attorney, Agent, or Firm*—Banner & Witcoff, Ltd.

(57) ABSTRACT

The invention relates to high-molecular, crosslinked polyvinyl butyrals, obtainable by (self-) crosslinking polyvinyl butyrals that contain coacetalated, acid-functionalized aldehydes. The invention also relates to a method for producing the same and to the use thereof.

10 Claims, No Drawings

HIGH-MOLECULAR, CROSSLINKED POLYVINYL BUTYRALS, METHOD FOR THE PRODUCTION AND USE THEREOF

CROSS-REFERENCE TO RELATED APPLICATIONS

This application is a 35 U.S.C. §371 National Phase filing of PCT Application No. PCT/EP02/09743 filed 31 Aug. 2002, which application claimed priority under German Patent Application Number 101 43 190.2, filed 4 Sep. 2001. The PCT application designated the United States and was published on 13 Mar. 2003 as WO 03/020776 A1.

The present invention relates to novel, high molecular weight, crosslinked polyvinyl butyrals, to a process for preparing them and to their use.

It is known that polyvinyl butyrals can be processed together with plasticizers by extrusion to produce films which are used, in particular, in laminated glass.

To increase the molecular weight of such polyvinyl butyrals, EP-A-0 211 818 proposes crosslinking them by means of stable, intermolecular diacetal links. Here, crosslinking is carried out by means of aldehydes having at least two aldehyde groups. The crosslinker is added before or during the acetalation of the polyvinyl alcohols with butyraldehyde.

However, owing to the high reactivity of the aldehydes, crosslinking of polyvinyl butyrals by means of dialdehydes leads to strongly crosslinked, very high molecular weight and therefore often insoluble poly-vinyl butyrals. Furthermore, the crosslinking reaction is difficult to control because of the low selectivity, as a result of which the production of reproducible product qualities is very difficult.

DE-A-100 18 517 proposes using diesters, in particular those of oxalic acid, for crosslinking polyvinyl butyrals. In this way, relatively high molecular weight products can be produced with very good reproducibility. However, a disadvantage is the necessity of adding the crosslinking reagent as additive prior to film extrusion. Owing to the two-phase nature of the system, this results in homogenization problems which make it necessary to employ an effective premixing step as additional process step. Furthermore, the need to add a crosslinker is a possible source of error for the film manufacturer, since weighing and metering errors can never be completely ruled out. A further disadvantage is the liberation of the low molecular weight alcohols formed in the transesterification, since these may lead to a need for increased safety precautions.

A further disadvantage of this procedure is that the particularly preferred (according to the prior art) and therefore increasing use of antiadhesion agents comprising divalent cations, in particular Mg(II) ions, together with the diesters leads to a complexing interaction between antiadhesion agent and crosslinker in the preparation of the crosslinked polyvinyl butyrals and in this way leads to a loss of adhesion-reducing action of the antiadhesion agent. A further disadvantage is that the crosslinking reaction proceeds less effectively as a result of the complexing interaction between antiadhesion agent and crosslinker.

The prior art also discloses the crosslinking of polyvinyl butyrals in coating applications by means of crosslinking reagents whose functional groups can form chemical bonds with the OH groups of the polyvinyl butyral. Examples of such crosslinking reagents are phenol-formaldehyde resins, polyfunctional aldehydes, polyfunctional epoxides, epoxy resins, melamine resins and polyfunctional isocyanates. A review of compounds which can be used for crosslinking polyvinyl butyrals is given, for example, in the product brochure "Mowital", August 1997 edition, from Clariant GmbH. Here too, the need to add a crosslinker is a disadvantage. A further disadvantage is that polyvinyl butyral is not compatible with all crosslinking reagents, which restricts the choice available for use.

Likewise in the field of coating applications, DE-A-27 52 054 discloses that aqueous polyvinyl butyral dispersions can also comprise aldehyde acids in order to reduce the amount of phosphoric acid necessary and to achieve a pH below 2. However, crosslinking of the polyvinyl butyral is not described.

U.S. Pat. No. 4,357,402 discloses that acetal-bonded glyoxylic acid can be used as catalyst for the crosslinking of polyvinyl alcohol, but dialdehydes have to be present for the actual crosslinking. Crosslinking of polyvinyl alcohol fragments of polyvinyl butyral by means of coacetalized glyoxylic acid is not described.

It is therefore an object of the present invention to provide high molecular weight polyvinyl butyrals which can be prepared highly reproducibly and without addition of a separate crosslinking reagent and are suitable for the production of products such as films and coatings.

A further object of the present invention is to provide high molecular weight, crosslinked polyvinyl butyrals which can, in their preparation, be admixed with the antiadhesion agents containing the divalent cations, in particular Mg(II) ions, customary in industry. Furthermore, the crosslinking reaction should not be hindered by divalent cations, in particular Mg(II) ions, when such polyvinyl butyrals are used.

It has surprisingly been found that polyvinyl butyrals containing small amounts of coacetalized, acid-functionalized aldehydes are thermoplastically crosslinkable without requiring the addition of separate crosslinkers. These can, in their preparation, be admixed with antiadhesion agents containing divalent cations, in particular Mg(II) ions, without decreasing the adhesion-reducing action of these antiadhesion agents.

The present invention accordingly provides high molecular weight, crosslinked polyvinyl butyrals obtainable by (self-)crosslinking of polyvinyl butyrals containing coacetalized, acid-functionalized aldehydes, preferably carboxyl-containing aldehydes and particularly preferably glyoxylic acid.

For the purposes of the present invention, polyvinyl butyrals are polyvinyl acetals whose predominant molar content of acetal units, preferably more than 50 mol %, are derived from butyraldehyde.

The preparation of polyvinyl butyrals containing coacetalized glyoxylic acid is known and is described for other applications in, for example, DE-A-27 52 054.

The crosslinked polyvinyl butyrals of the invention thus comprise the following structural unit:

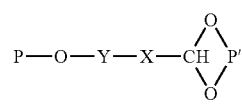

where
P and P' are identical or different polyvinyl butyral chains,
X is a bond or a divalent aliphatic or aromatic, linear or branched, organic radical, preferably having from 1 to 12 carbon atoms, and Y is a fragment of the oxo acids of carbon, of sulfur or of phosphorus.

The cyclic acetal is preferably a six- or five-membered ring derived from 1,3- or 1,2-diol units.

X is particularly preferably a bond- or a divalent, aliphatic, linear or branched, organic radical having from 1 to 6 carbon atoms. In particular, X is a bond.

The fragment Y is preferably CO, $SO_3$, $SO_2$, SO, $PO_3H$, $PO_2H$ or POH.

Particular preference is given to crosslinked polyvinyl butyrals comprising the following structural unit:

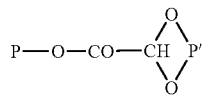

where

P and P' are identical or different polyvinyl butyral chains.

As starting materials, it is possible to use all known polyvinyl butyrals which contain coacetalized, acid-functionalized aldehydes, preferably carboxyl-containing aldehydes and particularly preferably glyoxylic acid, and are thus capable of esterification. The polyvinyl alcohols used for their synthesis are not restricted in respect of their molecular weight.

However, preference is given to using polyvinyl alcohols having a molecular weight of at least 20 000 g/mol (weight average).

The content of acid-functionalized acetal units, based on the total content of the polymer to be crosslinked, is preferably in the range from 0.01 to 10.0% by weight, particularly preferably in the range from 0.01 to 5.0% by weight and in particular in the range from 0.1 to 2.0% by weight.

In a preferred embodiment, the high molecular weight, crosslinked polyvinyl butyrals of the invention further comprise plasticizers. As plasticizers, it is possible to use all plasticizers known to those skilled in the art. The plasticizer is used in customary amounts as are known to those skilled in the art. Known plasticizers for polyvinyl butyrals are the esters of aliphatic monocarboxylic and dicarboxylic acids with monohydric or polyhydric alcohols or oligoalkylene glycol ethers, phosphoric esters and also various phthalates as are disclosed, for example, in U.S. Pat. No. 5,137,954. However, preference is given to using the diesters of diethylene glycol, triethylene glycol and tetraethylene glycol with aliphatic monocarboxylic acids, dialkyl adipates and also the dibenzoates of alkylene and polyalkylene glycols described in DE-A-101 00 681, which is not a prior publication.

The present invention also provides a process for preparing the polyvinyl butyrals of the invention, which comprises thermally crosslinking the polyvinyl butyral containing coacetalized, acid-functionalized aldehydes, if desired together with at least one plasticizer, at melt temperatures in the range from 80 to 2800°, preferably from 130 to 230° C.

The thermal crosslinking of the polyvinyl butyral can be carried out using all heatable apparatuses known to those skilled in the art, e.g. ovens, kneaders, extruders, presses or autoclaves. However, the thermal crosslinking is preferably carried out in an extruder. Crosslinking can be recognized by the higher molecular weight of the crosslinked polyvinyl butyral compared to the uncrosslinked polyvinyl butyral.

The polyvinyl butyrals can be produced in any shape by means of the preferred extrusion method. The present patent application thus also provides shaped bodies comprising the polyvinyl butyrals of the invention. However, preference is given to direct processing to produce films by means of slit dies. Films thus constitute a preferred subject matter of the present invention. Methods of producing polyvinyl butyral films have long been known to those skilled in the art. Crosslinking of the films of the invention can be recognized by a reduced melt index compared to films of homoacetals.

The films of the invention can further comprise additional, customary additives such as oxidation stabilizers, UV stabilizers, dyes, pigments and/or antiadhesion agents.

Laminated glass can be produced from the films of the invention containing the high molecular weight, crosslinked polyvinyl butyrals by methods known to those skilled in the art.

The present invention thus also provides for the use of the films of the invention in laminated glass.

Furthermore, the high molecular weight, crosslinked polyvinyl butyrals of the invention are used in coating of substrates.

The coatings can be applied to a wide variety of substrates, e.g. wood, metal, plastic, glass, textiles, paper, leather and ceramic and mineral substrates.

The present patent application thus also provides coatings comprising the high molecular weight, crosslinked polyvinyl butyrals of the invention.

The coatings can further comprise additional constituents such as polymeric resins, plasticizers, pigments, fillers, stabilizers, adhesion promoters, rheological aids, additives which influence the pH and additives which catalyze chemical reactions both between the high molecular weight polyvinyl butyral of the invention and other polymeric resins and also between the other polymeric resins themselves.

The coating can be applied either as powder which is subsequently melted and crosslinked at elevated temperature or from organic solution by means of coating processes known to those skilled in the art. When coating from solution is employed, the uncrosslinked, acid-modified polyvinyl butyral, if desired together with further binders and, if desired, other constituents such as plasticizers, pigments, fillers, stabilizers, adhesion promoters, rheological aids, is dissolved in the solvent or solvent mixture and then applied to the substrate to be coated. Crosslinking is carried out after evaporation of the solvent. Crosslinking of the coating is preferably carried out in a temperature range from 20 to 200° C. and particularly preferably in the range from 50 to 200° C. The crosslinking reaction can generally be aided by additives which lower the pH, e.g. organic and/or inorganic acids.

When the polyvinyl butyral is employed in coatings, crosslinking is indicated by an increase in the solvent resistance of the coating and an increase in the molecular weight compared to the uncrosslinked, acid-modified polyvinyl butyral.

The following examples and comparative examples serve to illustrate the invention without restricting its scope.

Mixing, Extrusion, Kneading Experiments

Polyvinyl acetals were mixed with plasticizer prior to extrusion or kneading. Mixing was carried out in a laboratory mixer (manufacturer: Brabender, model 826801). If desired, the UV stabilizer Tinuvin® P (manufacturer: Ciba Specialty Chemicals) and, if desired, a certain amount of dimethyl oxalate were dissolved in the plasticizer prior to preparation of the mixtures. In some cases, the antiadhesion agent magnesium 2-ethylhexanoate was added as a 30% strength solution in butyl glycol to the plasticizer before mixing. Flat films having a thickness of 0.8 mm were extruded from the PVB/plasticizer mixtures. Extrusion was carried out on a twin-screw extruder having contrarotating screws (manufacturer: Haake, System Rheocord 90), equipped with melt pump and slit die.

The kneading experiments were carried out using a laboratory kneader (manufacturer: Haake) at a temperature of 210° C. and a rotational speed of 50 rpm.

Melt Index

The films were conditioned at 23° C. and a relative atmospheric humidity of 50% for 24 hours prior to measurement of the melt index. The measurement of the melt index of the films was carried out on a melt index testing apparatus (manufacturer: Göttfert, type: MP-D) at 190° C. under a load of 2.16 kg using a 2 mm die in accordance with ISO 1133.

Compression Shear Test

The test specimens were produced as follows: the films were conditioned at 23° C./30% relative atmospheric humidity for 24 hours. They were laid on 2 mm float glass in a fire-tin orientation of the film to the glass surface. The glass was washed with deionized water prior to laying the film on it. The laminated glass sheets were produced by pressing the assemblies in a prelaminating oven using calender rolls at temperatures of from 40° C. to 100° C. followed by pressing of the assemblies in an autoclave at a pressure of 12 bar and a temperature of 140° C. for 30 minutes. To carry out the shear tests 10 test specimens having a size of 25.4×25.4 mm were cut from each of the laminated glasses. The test was carried out in accordance with DE 19643404 A1.

Moisture Content of PVB Films

The moisture content of PVB films was measured on laminated glass using an infrared photometer (manufacturer: Pier-Electronic GmbH, Wallau). The measurement apparatus was calibrated beforehand by means of an appropriate calibration standard.

Molecular Weight $M_w$

The determination of the molecular weights $M_w$ (=weight average) of the polyvinyl butyrals present in the molding compositions was carried out by means of gel permeation chromatography (GPC) in glacial acetic acid using RI detectors. The detectors were calibrated by means of PVB calibration standards whose absolute values were determined by means of random light scattering.

In the following, coacetal content is the content of acetal groups in the polymer which have been formed by the acetalation reaction with glyoxylic acid.

All concentrations reported are in percent by weight.

Comparative example 1 and examples 2-4 demonstrate the rising molecular weight increase with rising coacetal content during extrusion, which can be recognized by a decreasing melt index of the films at 190° C. The results are shown in table 1.

COMPARATIVE EXAMPLE 1 (CE 1)

374.5 g of PVB (polyvinyl alcohol content=20.5%, polyvinyl acetate content=1.1%, $M_w$=105 000 g/mol), 125.5 g of dihexyl adipate (DHA) and 0.75 g of Tinuvin P were mixed and extruded on a twin-screw extruder having contrarotating screws and equipped with a melt pump and slit die at a melt temperature of 190° C. to produce a flat film having a thickness of 0.8 mm.

The melt index at 190° C. (MFI 190) was determined on the resulting film as a measure of the molecular weight increase. The lower the MFI 190, the higher the molecular weight of the PVB after extrusion.

EXAMPLE 2 (E 2)

374.5 g of PVB having a polyvinyl alcohol content of 21.2%, a polyvinyl acetate content of 1.17%, a coacetal content of 0.061% and an $M_w$ of 106 000 g/mol were used. Other formulation constituents and procedure were as in comparative example 1.

EXAMPLE 3 (E 3)

374.5 g of PVB having a polyvinyl alcohol content of 20.7%, a polyvinyl acetate content of 1.06%, a coacetal content of 0.61% and an $M_w$ of 106 000 g/mol were used. Other formulation constituents and procedure were as in comparative example 1.

EXAMPLE 4 (E 4)

374.5 g of PVB having a polyvinyl alcohol content of 20.8%, a polyvinyl acetate content of 1.09%, a coacetal content of 1.23% and an $M_w$ of 106 000 g/mol were used. Other formulation constituents and procedure were as in comparative example 1.

TABLE 1

|  | CE 1 | E 2 | E 3 | E 4 |
| --- | --- | --- | --- | --- |
| Content of acetal derived from glyoxylic acid in the polymer [%] | 0 | 0.061 | 0.61 | 1.23 |
| MFI 190 [g/10 min] | 3.28 | 2.71 | 0.73 | 0.03 |

Comparative examples 5, 7 and 9 and examples 6, 8 and 10 demonstrate the influence of the melt temperature on the crosslinking reaction. The results are shown in table 2. The crosslinking reaction is favored by an increasing melt temperature.

COMPARATIVE EXAMPLE 5 (CE 5)

370 g of PVB as used in comparative example 1, 130 g of triethylene glycol di-n-heptanoate (3G7) and 0.75 g of Tinuvin P were extruded at a melt temperature of 190° C. as described in comparative example 1. The MFI 190 was determined on the film obtained.

EXAMPLE 6 (E 6)

370 g of PVB having a polyvinyl alcohol content of 20.1%, a polyvinyl acetate content of 1.5%, a coacetal content of 0.61% and an $M_w$ of 106 000 g/mol were used. Other formulation constituents and procedure were as in comparative example 5.

COMPARATIVE EXAMPLE 7 (CE 7)

The melt temperature was 220° C. Other parameters were as in comparative example 5.

EXAMPLE 8 (E 8)

370 g of PVB as used in example 6 were employed. Other formulation constituents and procedure were as in comparative example 7.

COMPARATIVE EXAMPLE 9 (CE 9)

The melt temperature was 240° C. Other parameters were as in comparative example 5.

EXAMPLE 10 (E 10)

370 g of PVB as used in example 6 were employed. Other formulation constituents and procedure were as in comparative example 9.

TABLE 2

|  | CE 5 | E 6 | CE 7 | E 8 | CE 9 | E 10 |
|---|---|---|---|---|---|---|
| Content of acetal derived from glyoxylic acid in the polymer [%] | 0 | 0.61 | 0 | 0.61 | 0 | 0.61 |
| Melt temperature [° C.] | 190 | 190 | 220 | 220 | 240 | 240 |
| MFI 190 [g/10 min] | 2.09 | 0.74 | 2.41 | 0.32 | 2.51 | 0.066 |

Comparative examples 11-12 show that use of the crosslinker dimethyl oxalate in combination with Mg salts adversely affects the adhesion-lowering action of the Mg salt, which can be seen by an increase in the shear test value. Example 13 demonstrates that such an effect does not occur in the case of the coacetals according to the invention in combination with Mg salts. The results are shown in table 3.

COMPARATIVE EXAMPLE 11 (CE 11)

360 g of PVB as used in comparative example 1, 140 g of triethylene glycol bis-2-ethylhexanoate (3G8) and 0.2 g of the antiadhesion agent magnesium 2-ethylhexanoate were extruded at a melt temperature of 220° C. using an extruder as described in comparative example 1. The MFI 190 and the molecular weight of PVB were determined on the film. The film was conditioned and then laminated onto 2 mm float glass. An adhesion test (shear test) was carried out on the composites obtained.

COMPARATIVE EXAMPLE 12 (CE 12)

Procedure as in comparative example 11. In addition, 0.856 g of dimethyl oxalate were used.

EXAMPLE 13 (E 13)

360 g of PVB as used in example 6 were employed. Other formulation constituents and procedure were as in comparative example 11.

TABLE 3

|  | CE 11 | CE 12 | E 13 |
|---|---|---|---|
| Content of acetal derived from glyoxylic acid in the polymer [%] | 0 | 0 | 0.61 |
| Magnesium isooctanoate content of the film [%] | 0.04 | 0.04 | 0.04 |
| Dimethyl oxalate content of the film [%] | 0 | 0.178 | 0 |
| MFI 190 [g/10 min] | 3.24 | 2.68 | 0.68 |
| $M_w$ of PVB in the film [g/mol] | 96 200 | 102 800 | 125 200 |
| Shear test F/Sn [N/mm$^2$] | 12.43 | 21.68 | 13.34 |

Comparative examples 14-16 and examples 17-18 demonstrate the influence of magnesium salts on the crosslinking reaction when using the crosslinking agent dimethyl oxalate and when using the coacetals according to the invention. It can be seen that when dimethyl oxalate is used as crosslinking reagent, the crosslinking reaction proceeds significantly less effectively in the presence of Mg salts. In contrast, when the coacetals according to the invention are used, the crosslinking reaction is actually promoted by Mg salts.

The results are shown in table 4.

COMPARATIVE EXAMPLE 14 (CE 14)

37.45 g of PVB as used in comparative example 1 and 12.55 g of DHA were mixed, introduced into a kneader and kneaded at a rotational speed of 50 rpm for 5 minutes at a temperature of 210° C. The molecular weight $M_w$ of the polyvinyl butyral obtained was measured on the resulting kneaded composition.

COMPARATIVE EXAMPLE 15 (CE 15)

Procedure as in comparative example 14. In addition, 0.089 g of dimethyl oxalate was used.

COMPARATIVE EXAMPLE 16 (CE 16)

Procedure as in comparative example 15. In addition, 0.0051 g of the antiadhesion agent magnesium 2-ethylhexanoate was used.

EXAMPLE 17 (E 17)

37.45 g of PVB as used in example 6 were employed. Other formulation constituents and procedure were as in comparative example 13.

EXAMPLE 18 (E 18)

Procedure as in example 17. In addition, 0.0051 g of the antiadhesion agent magnesium 2-ethylhexanoate was used.

TABLE 4

|  | CE 14 | CE 15 | CE 16 | E 17 | E 18 |
|---|---|---|---|---|---|
| Content of acetal derived from glyoxylic acid in the polymer [%] | 0 | 0 | 0 | 0.61 | 0.61 |
| Magnesium isooctanoate content of the film [%] | 0 | 0 | 0.01 | 0 | 0.01 |
| Dimethyl oxalate content of the film [%] | 0 | 0.178 | 0.178 | 0 | 0 |
| $M_w$ of PVB in the film [g/mol] | 93 700 | 107 500 | 100 550 | 108 850 | 112 700 |

Examples 19-20 and comparative examples 21-22 show the use of the coacetals according to the invention in coatings.

EXAMPLE 19 (E 19)

60 g of a PVB "A" (residual PVOH content: 20.2%, PV acetate content: 2.0%, coacetal content: 0.61%, solution viscosity: running-out time (20% strength solution, DIN 53211/Ford cup 4 mm/23° C.: 155 s) are dissolved in a solvent mixture comprising 67.7 g of ethanol, 38.7 g of n-butanol, 16.8 g of 3-methoxy-butanol and 16.8 g of ethylene glycol. The solution is applied in a wet film thickness of 60 μm to a test sheet made of tinplate and fired at 200° C. for 15 minutes. The resulting mean dry film thickness, measured using a Minitest 600 FN2 from Erichsen GmbH & Co. KG, was 10 μm.

EXAMPLE 20 (E 20)

60 g of PVB "A" are dissolved in the solvent mixture used in example 19. Subsequently, 0.08 g of Nacure 5925 (blocked para-toluenesulfonic acid from Worlee) is added as catalyst. The solution is processed as described in example 19, giving a dry film thickness of 9 μm after firing.

COMPARATIVE EXAMPLE 21 (CE 21)

60 g of a PVB "B" (residual PVOH content: 20.2%, PV acetate content: 2.0%, solution viscosity: running-out time (20% strength solution, DIN 53211/Ford cup 4 mm/23° C.): 164 s) prepared from polyvinyl alcohol and n-butyraldehyde are dissolved in the solvent mixture used in example 19. The solution is processed as in example 18, giving a dry film thickness of 10 μm after firing.

COMPARATIVE EXAMPLE 22 (CE 22)

60 g of PVB "B" are dissolved in the solvent mixture used in example 19. Subsequently, 0.08 g of Nacure 5925 (blocked para-toluenesulfonic acid from Worlee) is added as catalyst. The solution is processed as described in example 19, giving a dry film thickness of 11 μm after firing.

To test the coatings from examples 19 and 20 and comparative examples 21 and 22, the ethanol test was employed. For this purpose, a cotton cloth was soaked with ethanol and rubbed over the coating. Table 5 reports the number of double strokes which were employed to rub through the coating. Higher numerical values in this test indicate that the coating is attacked more slowly by ethanol, i.e. it is more strongly crosslinked.

TABLE 5

| Results of the ethanol test | | | | |
|---|---|---|---|---|
|  | E 19 | E 20 | CE 21 | CE 22 |
| Number of double strokes | 20 | 52 | 5 | 6 |

The invention claimed is:

1. A process for preparing a crosslinked polyvinyl butyral, comprising the steps of:
   providing a polyvinyl butyral containing coacetalized, acid-functionalized aldehydes; and
   thermally (self-)crosslinking the polyvinyl butyral in an extruder at melt temperatures in the range from 80° C. to 280° C.

2. The process of claim 1, wherein the acid-functionalized aldehydes are carboxyl-containing aldehydes.

3. The process of claim 1, wherein the acid-functionalized aldehyde is glyoxylic acid.

4. The process of claim 1, wherein the melt temperatures are in the range from 130° C. to 230° C.

5. The process of claim 1, wherein the polyvinyl butyral to be thermally crosslinked has from 0.01 to 10.0% by weight, based on the total weight of the polyvinyl butyral, of acid-functionalized acetal units.

6. The process of claim 1, wherein the polyvinyl butyral to be thermally crosslinked has from 0.1 to 2.0% by weight, based on the total weight of the polyvinyl butyral, of acid-functionalized acetal units.

7. The process of claim 1, wherein at least one plasticizer is present during the thermal (self-)crosslinking step.

8. The process of claim 1, further comprising the step of extruding the polyvinyl butyral as a film.

9. The process of claim 1, further comprising the step of extruding the polyvinyl butyral as a shaped body.

10. A process for preparing laminated glass, comprising the steps of:
    providing a polyvinyl butyral containing coacetalized, acid functionalized aldehydes;
    thermally (self-)crosslinking the polyvinyl butyral in an extruder at melt temperatures in the range from 80 to 280° C.;
    extruding the polyvinyl butyral as a film; and
    laminating the film onto a glass surface.

* * * * *